| United States Patent [19] | [11] | 4,136,781 |
|---|---|---|
| Perry et al. | [45] | Jan. 30, 1979 |

[54] CAN SORTING APPARATUS

[75] Inventors: Vernon L. Perry, Walla Walla, Wash.; Ronald D. Kelsey, Milton-Freewater, Oreg.

[73] Assignee: Applied Magnetics Corporation, Goleta, Calif.

[21] Appl. No.: 802,267

[22] Filed: May 31, 1977

[51] Int. Cl.² .............................................. B07C 5/00
[52] U.S. Cl. .................................. 209/552; 209/636; 209/934; 198/461; 198/679
[58] Field of Search .............. 209/72, 73, 74 R, 74 M, 209/111.7 R, 111.7 T, 111.8, 111.6, 121; 198/598, 679, 690, 437, 439, 579, 453, 452, 461, 367

[56] References Cited

U.S. PATENT DOCUMENTS

| 2,817,438 | 12/1957 | Birchall | 209/74 R X |
| 2,890,785 | 6/1959 | Nigrelli et al. | 198/439 X |
| 3,323,633 | 6/1967 | Engel et al. | 198/579 X |

Primary Examiner—Allen N. Knowles
Attorney, Agent, or Firm—Wells, St. John & Roberts

[57] ABSTRACT

A can sorting apparatus is described for processing over 600 filled metal cans per minute. An infeed conveyor moves alongside a main conveyor in which the main conveyor is moving at a speed greater than the infeed conveyor. A transverse diverter directs the moving cans from the infeed conveyor to the main conveyor causing the cans to be automatically spaced as they move from the infeed conveyor to the main conveyor. The cans move past a sensing station to individually identify the cans and determine which cans are to be separated from the others. An overhead separating conveyor extends across the main conveyor at a separating station. An overhead electromagnet is positioned at the separating station to selectively lift a can from the main conveyor and bias the can upward against the lower flight of the overhead conveyor. The overhead conveyor then directs the lifted can transversely from the single line of filled cans to perform the separation of the cans.

8 Claims, 7 Drawing Figures

CAN SORTING APPARATUS

BACKGROUND OF THE INVENTION

This invention relates to can sorting equipment and more particularly to equipment for high speed sorting of filled cans.

One of the principal objects of this invention is to provide a high speed can sorting apparatus that is capable of sorting over six hundred filled cans per minute. It is relatively easy to sort cans on a rather slow basis of less than three hundred cans per minute. Furthermore it is relatively easy to sort empty or unfilled cans. However, it is very difficult to separate filled cans at a rate of over six hundred cans per minute. It is difficult to selectively divert heavy filled cans from a fast moving line of cans without damaging the cans, jamming the equipment, and/or diverting the "wrong" cans.

An additional object of this invention is to provide a high speed can sorting apparatus utilizing an electromagnetic system for sorting filled cans.

A still further object of this invention is to provide a high speed can sorting apparatus that minimizes the possibility of damage to the cans and greatly increases the accuracy of the sorting system.

An additional object of this invention is to provide a high speed can sorting apparatus that is economical to construct and may be adapted for various size cans in various sorting systems.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings, in which.

DETAILED DESCRIPTION OF A PREFERRED EMBODIMENT

Figure 1:
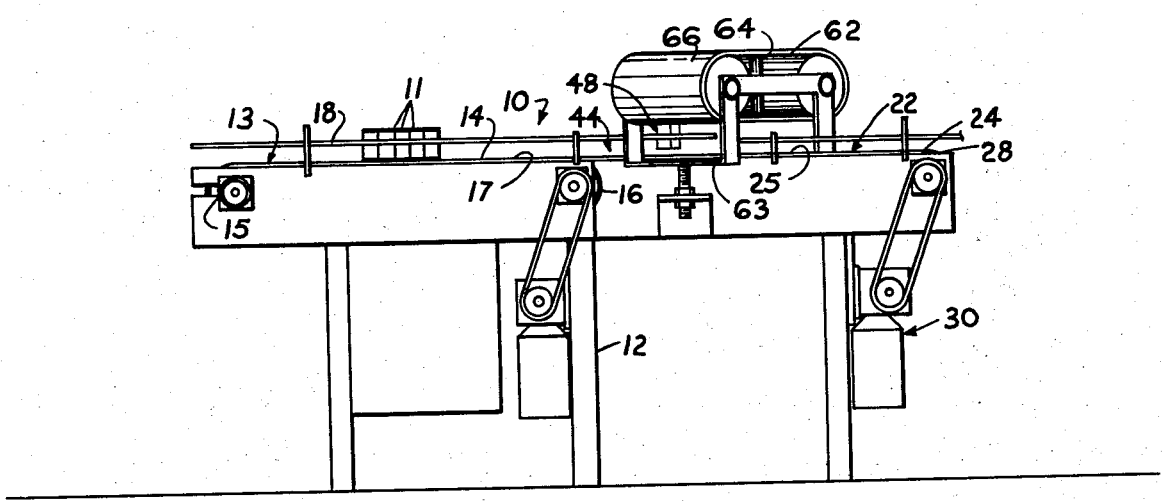
FIG. 1 is a side view of a can sorting apparatus embodying the principal features of this invention.

Referring now in detail to the drawings there is illustrated in FIG. 1 a can sorting apparatus 10 for sorting cylindrical metal cans that have been filled with material that exceeds the weight of the empty can. The cans are preferably constructed of tin-plated steel. Each can 11 has sealed lids both top and bottom to seal the material in the can. The can sorting apparatus 10 tends to be particularly useful in sorting cans full of fruits or vegetables. It should be noted that the cans have a diagonal dimension that is greater than the height of the can. This particular feature becomes important in understanding the operation of the can sorting apparatus. Preferably the apparatus is capable of sorting cans having diameter sizes from 109 to 509 inclusive.

The can sorting apparatus includes a general frame 12 that supports an infeed conveyor 13 along one side thereof. The infeed conveyor 13 includes a continuous belt 14 that extends from a head pulley 15 to a tail pulley 16 to provide a top flight 17 that supports and moves the filled cans. The cans are directed in a prescribed longitudinal path on the infeed conveyor 13 by longitudinal rails 18 and 19 that are spaced slightly greater than the diameter of the can to cause the cans to form a single line. The infeed conveyor 13 is driven at a preselected speed sufficient to handle at least 600 cans per minute by an appropriate drive motor.

Figure 2:
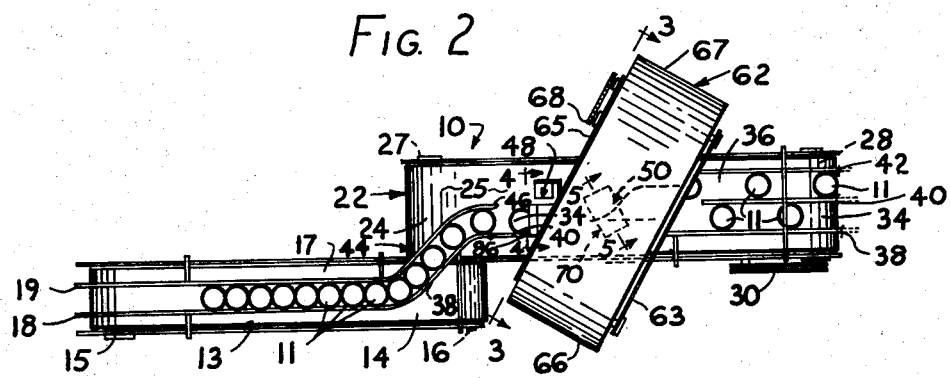
FIG. 2 is a plan view of the can sorting apparatus illustrated in FIG. 1 showing a transverse separating overhead conveyor overlying the flow of cans.
Figure 3:
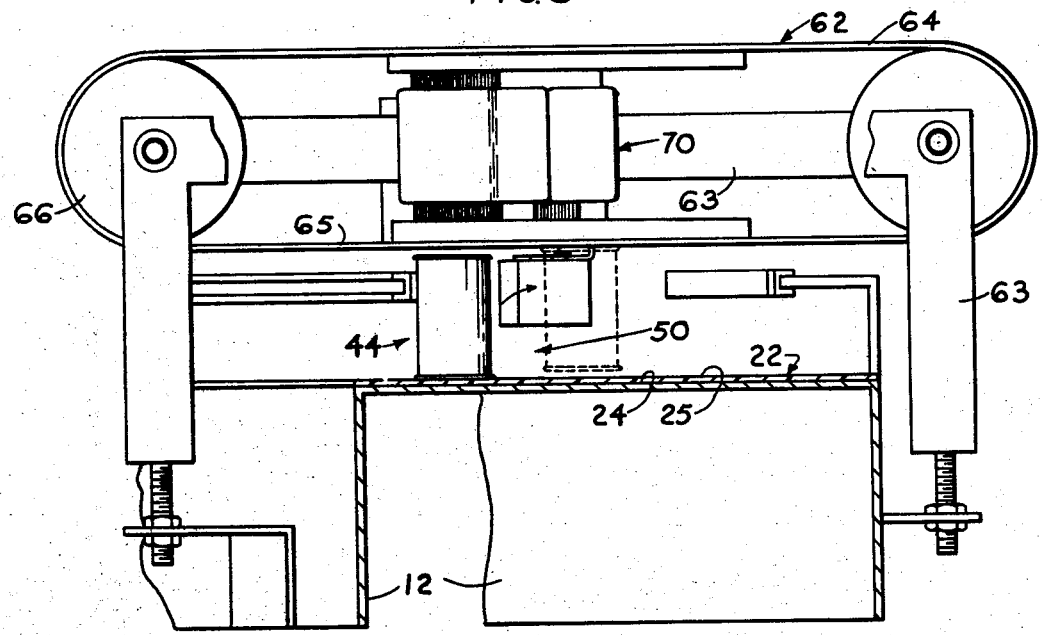
FIG. 3 is an enlarged fragmentary vertical cross-sectional view taken along line 3—3 in FIG. 1 illustrating in more detail the overhead conveyor in conjunction with a lifting electromagnet.
Figure 4:
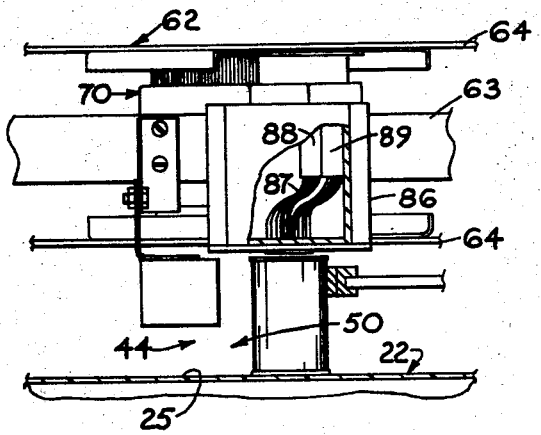
FIG. 4 is an enlarged cross-sectional view taken along line 4—4 in FIG. 3 further illustrating the structure of the electromagnet.

The can sorting apparatus 10 further includes a horizontal main conveyor 22 that extends alongside the infeed conveyor 13 in a longitudinally overlapping manner illustrated in FIG. 2. The main conveyor 22 includes a wide belt 24 that extends from a head pulley 27 to a tail pulley 28 adjacent the rear of the machine to handle at least two lines of cans. A motor drive 30 is operatively connected to the main conveyor 22 for driving the main conveyor at a speed sufficient to move the upper flight 25 of the belt 24 at a speed at least 50 feet per minute greater then the speed of the infeed conveyor 13.

In one application the applicants have found that the apparatus can handle over 600 cans per minute utilizing an infeed conveyor or flight speed of approximately 180 ft. per minute and a main conveyor flight speed of approximately 240 feet per minute.

The can sorting apparatus 10 includes a spacing station 44 at which the cans are automatically spaced in relation to each other in order to provide a minimum desired spacing. At the spacing station 44 a diversion guide rail 46 is mounted in the path of the cans on the infeed conveyor 13. In the preferred embodiment the diverting guide rail 46 includes a continuation of the rail 19 that extends at an oblique angle from the infeed conveyor 13 transversely to the main conveyor 22 to deflect and direct the cans from the infeed conveyor path onto the main conveyor 22. Because of the differential speed between the belts 14 and 24, the cans are automatically spaced as the cans transfer from the infeed conveyor 13 to the main conveyor 22. The cans are initially directed in a single longitudinal line on the main conveyor 22 that is defined by rails 38 and 40. The rails 38 and 40 are substantially parallel and extend in the longitudinal direction of the conveyor to guide the spaced cans in a single file path identified by numeral 34.

The rails 38 and 40 guide the spaced cans from the spacing station past a sensing station to determine the identity of each passing thereby. Various types of sensing systems can be utilized for identifying the cans. In a preferred embodiment the sensing station 48 includes a system for determining the color of the lid or whether or not the can lid has a desired color. Frequently it is desirable to separate cans that have bright colored lids of high reflectance (gold lid) from cans having dull color lids of rather low reflectance (silver lid) or vice versa. Alternatively, printed idicia sensing systems can be utilized to sense the presence or absence of indicia on the lid or side of the can.

From the sensing station 48 the cans continue to move downstream to a separating or sorting station 50 in which the selected cans sensed by the sensing system are removed from the single line and the other cans and physically moved from the path 34 to a second path 36.

The separating station 50 has an overhead separating conveyor 62 that extends transversely to the movement of the main conveyor 22. The overhead conveyor 62 is supported above the main conveyor 22 by adjustable brackets 63 that enable the overhead conveyor to be adjusted vertically with respect to the upper flight 25 of the belt 24. The overhead conveyor 62 includes a wide continuous nonmagnetic belt 64 having a lower flight 65 that extends from a head end of the conveyor 66 to a tail end 67. The belt 64 is continuously moved by a drive motor 68. In a preferred embodiment the distance between the belt 24 and the lower flight 65 is slightly greater than the height of the cans and less than the diagonal dimension of the cans 11 so as to permit the cans to pass therethrough yet prevent the cans from tipping over as they are being separated.

The overhead separating conveyor 62 is mounted at an acute angle $\alpha$ of between 30° and 65° with respect to the main conveyor 22. In a preferred embodiment the overhead conveyor 62 is mounted at substantially 60° with respect to the main conveyor 22.

The can sorting apparatus 10 further includes an electromagnet 70 that is positioned at the separating station 50 directly above the belt 24. The electromagnet is positioned by brackets 71 immediately above the lower flight 65 of the belt 64. The electromagnet 70 includes electrical coils 72 that surround a horseshoe-shaped metal electromagnet core 73 having spaced end pole plates or pieces 74 and 75 that are directed downward at the separating station 50. The lower flight 65 or the belt 64 moves along the bottom of the pole plates 74 and 75.

The electromagnet 70 when energized, generates a concentrated magnetic flux that is directed downwardly to generate a magnetic force to lift the can 11 directly thereunder from the upper flight 25 and direct the lifted can against the lower surface of the lower flight 65. The belt 64 is constructed of a nonmagnetic material that enables the heavy filled can 11 to slide laterally on the surface of the belt 64. As illustrated in FIG. 2, belt 64 has a wide width substantially greater than the diameter of the cans to enable the cans to slide laterally on the belt surface while being redirected laterally. This enables the can 11 to progressively change direction from the path 34 rather than provide for an abrupt change. When the metallic can 11 engages the belt flight 65, a frictional force is applied to the top of the can to progressively change the direction of the can and to laterally displace the can from the first path 34 and direct the can laterally towards the second path 36. When the overhead belt 64 conveys the lifted can 11 out of the main influence of the electromagnet 70, the weight of the filled can causes the can to drop from the lower flight 65 back onto the main conveyor 22.

The surface of the belt 24 is designed to enable the can 11 to slide on the belt surface as the belt 24 redirects the can in a longitudinal direction of the second path 36. The path of the can 11 as it is transferred from the first path 34 to the second path 36 forms an "S" shape curve that is illustrated in FIG. 2. In the preferred embodiment the surfaces of belts 24 and 64 enable the can to slide thereon as the can direction is being changed to provide a smooth transition from the first path to the second path in the separating process which in turn reduces the likelihood of damage to the heavy filled cans.

It should be noted that the electromagnet 70 is mounted at an angle with respect to the overhead conveyor 62. Such an angle enables the electromagnet to be more effective in influencing the direction of the can along the "S" curve than if the electromagnet 70 were positioned parallel with the direction of the overhead conveyor 62. In a preferred embodiment the electromagnet 70 is positioned at an acute angle $\beta$ of approximately 45° with respect to the main conveyor 22. Such an arrangement enables the system to be utilized with a smaller electromagnet that may be more rapidly energized and de-energized.

Figure 6:
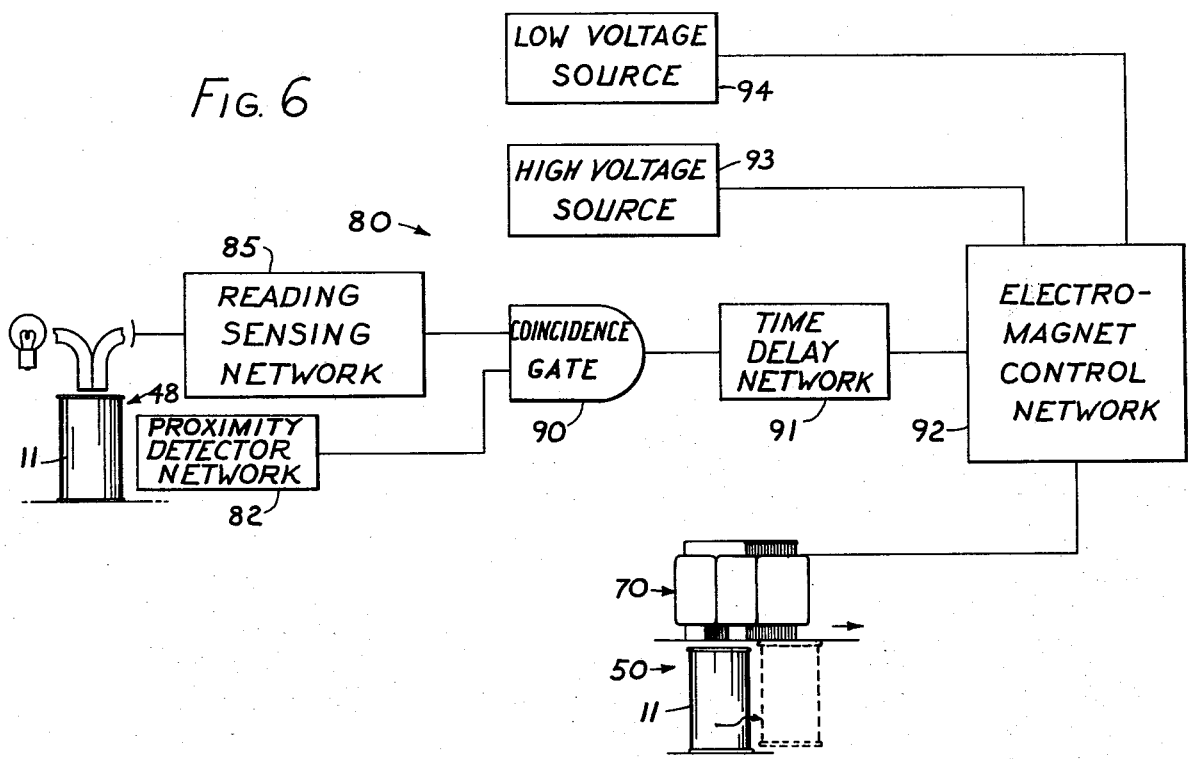
FIG. 6 is an electrical schematic illustrating a control system for the can sorting apparatus.

The can sorting apparatus includes a control means 80 illustrated in schematic form in FIG. 6. The control means 80 may include a proximity detection network 82 that senses the presence of a can 11 at the sensing station 48. Proximity detection network 82 is optional depending upon the nature of the sensing system and the cans.

Figure 5:
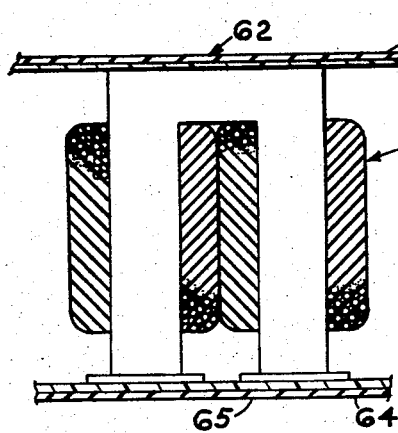
FIG. 5 is an enlarged fragmentary cross-sectional view taken along line 5—5 in FIG. 2 illustrating a can sensing system.

The control means 80 includes a reading sensing network 85 that determines the identity of the can at the sensing station to determine whether or not the can is one that should be separated from the other cans in the single file. In a preferred embodiment the reading sensing network 85 is designed to separate cans having bright colored (gold) can lids from those cans having dull colored (silver) lids with less reflectance. Such sensors frequently are referred to as "silver - gold" sensors in which the cans having the brighter gold color are separated from those cans having the duller silver color. Various types of sensing networks can be utilized. The sensing network may include means for reading printed indicia on either the lid, or the side of the can, or the network can include color-separating techniques for determining a stripe of color on the can side or on the lid. In the preferred embodiment illustrated in FIG. 5, an optical reading head 86 is placed at the sensing station 48. the optical reading head 86 includes a "Y" optical fiber bundle 87 in which the lower leg of the "Y" is directed downwardly immediately above the can for reading the color "color" or "brightness" of the can lid. The optical fiber bundle 87 extends from a light source 88 that directs light energy through a portion of the optical bundle downwardly to impinge upon the can lid. The other portion of the optical bundle is directed to a light sensitive receiver 89 for determining the amount of light reflected from the can lid. A brightly colored lid will reflect more light than a dull colored lid; consequently the receiver 89 will sense the increased reflection from the can. The reading sensing network 85 then generates a signal that is passed to a coincidence gate 90.

Coincidence gate 90 will pass the signal if the proximity detection network 82 indicates that a can is present at the sensing station. From the gate 90 the signal is processed by a time-delay network 91 to delay the signal a period sufficient for the can to move from the sensing station 48 to the separating station 50. The delayed signal then is directed to an electromagnetic control network 92 for selectively energizing the electromagnet 70. The electromagnetic control network 92 applies a voltage from two different voltage sources 93 and 94 to the electromagnet 70. When the delayed signal is received by the electromagnetic control means 92, it initially applies voltages from a high voltage source 93 and from a low voltage source 94 to quickly energize the electromagnet 70. The application of the high voltage source 93 to the electromagnet 70 quickly energizes the electromagnet to generate sufficient magnetic flux to lift the desired can from the belt 24 and direct the can upward against the lower flight 65 of the overhead separating conveyor 62. When sufficient magnetic flux is generated to overcome the weight of the filled can, the electromagnetic control network 92 discontinues the application of the high voltage source 93. The low voltage source 94 is sufficient to maintain the can against the lower flight 65 as the can is deflected or moved from the first path 34 toward the second path 36. As soon as the can is out of the influence of the electromagnet 70 the low voltage application is discontinued to enable the electromagnet 70 to quickly discharge in preparation to receive a succeeding can.

As the metal can moves from beneath the electromagnet 70 it drops from the upper belt 64 back onto the lower belt 24. The momentum of the filled can as it moves along the bottom of the overhead conveyor 62 is sufficient when dropped to enable the can to slide completely into the second path 36 between rail guides 40 and 42. Those cans that are not to be separated continue along the first path 34 and move between guide rails 38 and 40.

It has been found that a urethane covered polyester belting marketed under the mark "Transilon" is a satisfactory belting material for belts 24 and 64. Other types of belting material may be utilized depending upon the desired application and weight of the filled cans.

Figure 7:
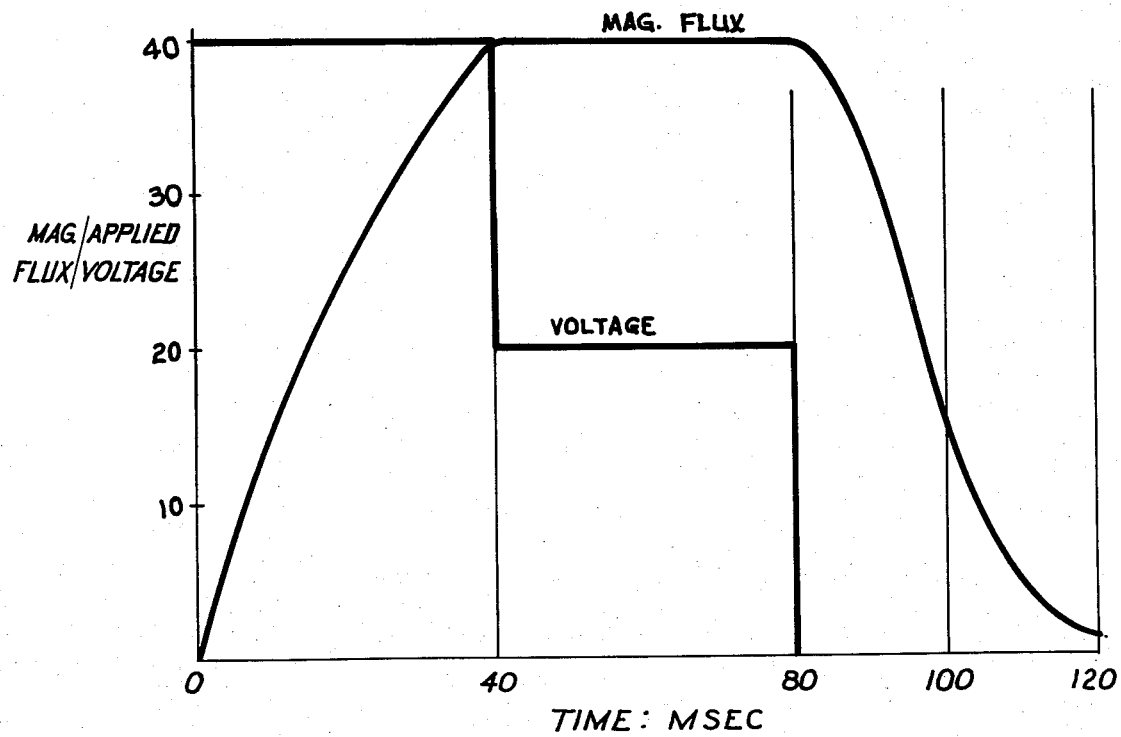
FIG. 7 is a schematic view showing a graph relating to the operation of the electromagnet in which the graph indicates the magnetic flux verses time and the applied voltage versus time.

The application of the voltage energy to the electromagnet 70 is illustrated in FIG. 7. The graph shows a rapid initial application of both the high voltage and the low voltage for a period sufficient to rapidly energize electromagnet 70. In one application the electromagnetic control network 92 is designed to apply the high voltage for approximately 40 milliseconds which is sufficient to cause the can to be elevated from the belt 24 against the lower flight 65 of the overhead separating conveyor 62. The low voltage is continued for an additional 40 milliseconds to cause the can to change direction and proceed from the first path 34 toward the second path 36. After the change of direction is accomplished, the electromagnetic control network 82 immediately discontinues the application of the low voltage source 94 enabling the electromagnet to quickly discharge as is indicated by the rapid descent of magnetic flux with respect to time. As indicated in the graph shown in FIG. 7, the electromagnet is totally de-energized within approximately 120 milliseconds after the voltage is first applied. It should be noted that this is an extremely rapid rate of energization and de-energization of the electromagnet to accomplish the rapid separation. Moreover, it should be noted that the voltage levels are considerably lower than would originally be contemplated to be able to quickly energize such an electromagnet to lift and move filled cans. The low voltage application increases the life of the electromagnet 70 without causing undue heating of the electromagnet.

The above described embodiment is simply illustrative of the principles of this invention and numerous other embodiments may be readily devised without deviating therefrom.

Therefore only the following claims are intended to define this invention.

We claim:

1. A can sorting apparatus for selectively sorting cans in which the cans have a known height, width and diagonal dimension, comprising:

a can conveyor for supporting a plurality of cans and for successively rapidly moving the cans forward in a conveyor path past a sorting station;

an overhead separating conveyor overlying the can conveyor at the sorting station and extending transverse to the conveyor path;

said overhead separating conveyor having a wide continuous belt with a transverse continuously moving lower flight vertically spaced above the can conveyor a distance greater than the height of the cans and less than the diagonal dimension of the cans in which the belt has a width substantially greater than the diameter of the can;

said wide belt having a surface adapted to enable a can to readily slide on the surface;

an energizable electromagnet associated with the overhead conveyor and directly above the conveyor path for generating a magnetic force of sufficient strength to lift a rapidly moving can from the can conveyor and hold the lifted can in frictional engagement with the moving lower flight of the overhead separating conveyor to impart a transverse force to the lifted can to bias the lifted can laterally while enabling the lifted can to slide forward on the belt surface of the overhead separating conveyor to thereby progressively displace the rapidly moving can from the conveyor path;

control means for sensing the presence of a desired can at the sorting station and selectively energizing the electromagnet to lift the desired can from the can conveyor and hold the can against the lower moving flight of the overhead conveyor to remove the desired can from the conveyor path.

2. The can sorting apparatus as defined in claim 1 wherein the overhead separating conveyor is oriented at a horizontal acute angle of between 30° and 65° to the conveyor path.

3. The can sorting apparatus as defined in claim 2 wherein the acute angle is approximately 60° to the conveyor path.

4. Can sorting apparatus as defined in claim 1 wherein each can is full of material that exceeds the weight of the can itself.

5. The can sorting apparatus as defined in claim 4 wherein the can conveyor moves the full cans in a conveyor flight at the preset linear velocity and wherein the lower flight of the overhead separating conveyor moves at a linear velocity of at least 50 feet per minute greater than the preset linear velocity of the cans on the can conveyor.

6. The can sorting apparatus as defined in claim 1 wherein control means includes (1) a first voltage supply circuit means for initially supplying a high voltage to the electromagnet to rapidly increase the magnetic force of the electromagnet to lift a can from the can conveyor, and (2) a second voltage supply circuit means for applying a reduced voltage to the electromagnet to hold the lifted can to the lower flight of the overhead conveyor.

7. The can sorting apparatus as defined in claim 1 further comprising spacing means for longitudinally evenly spacing the cans on the can conveyor prior to the cans approaching the sorting station.

8. The can sorting apparatus as defined in claim 7 wherein the can conveyor has a preset flight speed and wherein the spacing means includes (1) an infeed conveyor extending alongside the can conveyor having a flight speed less than the can conveyor speed, and (2) a diverter guide for laterally deflecting the cans from the slower feed conveyor onto the faster can conveyor to evenly space the cans as the cans transfer from the feed conveyor to the can conveyor.

* * * * *